United States Patent
Hwang

(10) Patent No.: US 9,605,752 B2
(45) Date of Patent: Mar. 28, 2017

(54) CONTROL METHOD FOR AUTOMATIC TRANSMISSION

(71) Applicant: HYUNDAI MOTOR COMPANY, Seoul (KR)

(72) Inventor: Jin Young Hwang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/156,099

(22) Filed: May 16, 2016

(65) Prior Publication Data

US 2017/0059037 A1    Mar. 2, 2017

(30) Foreign Application Priority Data

Aug. 24, 2015    (KR) .......................... 10-2015-0119095

(51) Int. Cl.
*G06F 17/00*    (2006.01)
*F16H 61/12*    (2010.01)

(52) U.S. Cl.
CPC ..... *F16H 61/12* (2013.01); *F16H 2061/1232* (2013.01)

(58) Field of Classification Search
CPC .......................... F16H 61/12; F16H 2061/1232
See application file for complete search history.

(56) References Cited

U.S. PATENT DOCUMENTS

| | | | | |
|---|---|---|---|---|
| 5,649,880 A * | 7/1997 | Tsutsui | .................. | B60W 10/06 477/109 |
| 5,813,943 A * | 9/1998 | Kousaka | ................. | F16H 61/20 477/115 |
| 6,755,766 B2 * | 6/2004 | Inoue | .................... | F16D 48/066 192/3.58 |
| 8,641,571 B2 * | 2/2014 | Ichikawa | ............... | B60K 6/383 475/170 |
| 2008/0215214 A1 * | 9/2008 | Matsubara | ............ | B60W 10/06 701/51 |

FOREIGN PATENT DOCUMENTS

| | | |
|---|---|---|
| JP | 4998437 B2 | 8/2012 |
| JP | 2014-228087 A | 12/2014 |
| JP | 5685160 B2 | 3/2015 |
| KR | 10-2003-0023256 A | 3/2003 |
| KR | 10-0527496 B1 | 11/2005 |

* cited by examiner

*Primary Examiner* — David J Hlavka

(74) *Attorney, Agent, or Firm* — McDermott Will & Emery LLP

(57) ABSTRACT

A control method for an automatic transmission and a two-way clutch includes determining whether a current speed stage is a forward speed stage, comparing a rotation speed of the two-way clutch with a predetermined minimum rotation speed if a current speed stage is a forward speed stage, deciding that the two-way clutch has failed when a rotation speed of the two-way clutch is lower than the predetermined minimum rotation speed, and performing a fail-safe mode if the two-way clutch has failed.

11 Claims, 2 Drawing Sheets

CONTROL METHOD FOR AUTOMATIC TRANSMISSION

CROSS-REFERENCE TO RELATED APPLICATION

This application claims the benefit of priority to Korean Patent Application No. 10-2015-0119095, filed with the Korean Intellectual Property Office on Aug. 24, 2015, the entire contents of which are incorporated herein by reference.

TECHNICAL FIELD

The present disclosure relates to a control method for an automatic transmission. More particularly, the present disclosure relates to a control method for an automatic transmission which is configured that a two-way clutch is applied thereto.

BACKGROUND

In recent years, a rise in oil price has increased the drive to enhance fuel efficiency for economic and environmental benefits.

As a result, research into reduction of weight and the enhancement of fuel efficiency through downsizing is conducted for engines and research for simultaneously securing operability and fuel efficiency competitiveness through multiple speed stages is conducted for automatic transmissions.

However, in the automatic transmission, as the number of speed stages increases, the number of internal components increase, and as a result, mountability, cost, weight, transmission efficiency, and the like may still deteriorate.

A two-way clutch is a friction member which is operated to perform functions of one-way clutch and a brake. The two-way clutch is often applied so as to perform both roles of an under drive clutch and an LR brake (low and reverse brake).

Therefore, if the two-way clutch is applied to an automatic transmission, the number of speed stages may increase, weight may be reduced, and improvements in transmission efficiency may be achieved.

However, a non-traditional control method is required for performing fail-safe operation of the two-way clutch which is differently configured than an ordinary one-way clutch.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a control method for an automatic transmission having advantages of effectively performing, or operating, a fail-safe mode of a two-way clutch.

A control method for an automatic transmission according to an exemplary embodiment of the present disclosure may be a control method for an automatic transmission and a two-way clutch. The control method may include determining whether a current speed stage is a forward speed stage; comparing a rotation speed of the two-way clutch with a predetermined minimum rotation speed if a current speed stage is a forward speed stage; deciding that the two-way clutch has failed when a rotation speed of the two-way clutch is lower than a predetermined minimum rotation speed, and performing, or operating, a fail-safe mode if the two-way clutch has failed.

Determining whether a current speed stage is a first forward speed stage may precede comparing a rotation speed of the two-way clutch with the predetermined minimum rotation speed if it is determined that a current speed stage is a forward speed stage.

Determining whether a current speed stage is a forward speed stage may be performed again if it is determined that a current speed stage is a first forward speed stage.

Comparing a rotation speed of the two-way clutch with the predetermined minimum rotation speed may be performed if it is determined that a current speed stage is not a first forward speed stage.

Determining whether a current speed stage is a forward speed stage may be repeatedly performed if it is determined that a current speed stage is not a forward speed stage.

The control method may further include deciding that the two-way clutch has not failed when a rotation speed of the two-way clutch is the same as or higher than a predetermined minimum rotation speed, and determining whether a current speed stage is a forward speed stage may be repeated if it is decided that the two-way clutch has not failed.

A rotation speed of the two-way clutch may be measured by a speed sensor.

The fail-safe mode may include, fixing a speed stage to a first forward speed stage, supplying hydraulic pressure to the two-way clutch and releasing hydraulic pressure from a clutch other than the two-way clutch.

The fail-safe mode may further include lighting a warning lamp such that a driver recognizes a failure of the two-way clutch and operation of the fail-safe mode for the automatic transmission.

The control method may be started together with a starting of the engine.

The control method may be ended when an operation of the fail-safe mode is completed.

DETAILED DESCRIPTION

An exemplary embodiment of the present disclosure will hereinafter be described in detail with reference to the accompanying drawings.

Figure 1:
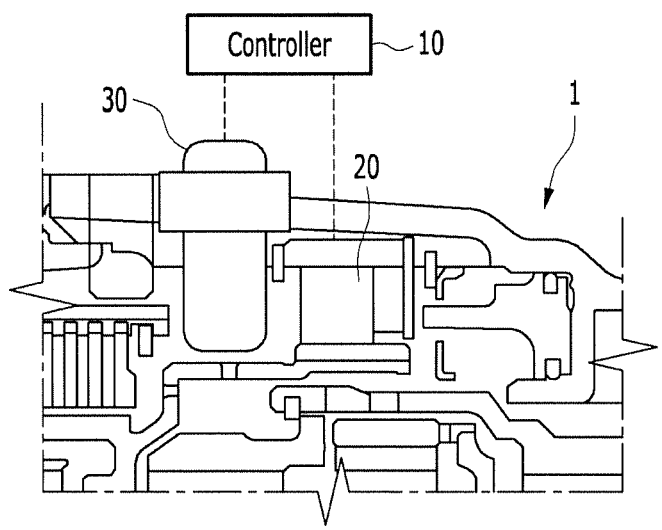
FIG. 1 is a schematic diagram of an automatic transmission which is controlled by a control method for an automatic transmission according to an exemplary embodiment of the present disclosure.

FIG. 1 is a schematic diagram of an automatic transmission which is controlled by a control method for an automatic transmission according to an exemplary embodiment of the present disclosure.

As shown in FIG. 1, an automatic transmission 1 which is controlled by a control method for an automatic transmission according to an exemplary embodiment of the present disclosure may include a controller 10, a two-way clutch 20 and a speed sensor 30.

The controller 10 may be an electronic control unit (ECU) generally controlling electronic devices of a vehicle. The controller 10, which is provided to control electronic devices of a vehicle, is well known to a person of ordinary skill in the art, and thus a detailed description thereof will be omitted.

The two-way clutch 20 performs functions of both an under drive clutch and an LR brake (low and reverse brake). In addition, the two-way clutch 20, in a case where hydraulic pressure is not supplied, performs the function of the under drive clutch as a one-way clutch which can deliver power toward only one direction, and in a case that hydraulic pressure is supplied, performs the function of the LR brake which can deliver power toward two directions. Further, supplying hydraulic pressure to the two-way clutch 20 is selectively performed by a valve, which is electronically operated, such as solenoid valve (not shown), and the electronically operated valve is controlled by the controller 10. That is, the two-way clutch 20 is operated, directly or indirectly, by the controller 10.

Meanwhile, the two-way clutch 20 functions as the LR brake according to received hydraulic pressure when the automatic transmission 1 is operated so as to achieve a first forward speed stage, and functions as the under drive clutch according to a release of hydraulic pressure when the automatic transmission 1 is operated so as to achieve forward speed stages other than a first forward speed stage.

Herein, failure of the two-way clutch 20 means a state of functioning as the LR brake even while hydraulic pressure is not supplied. That is, when failure of the two-way clutch 20 occurs, forward speed stages other than a first forward speed stage of forward speed stages (D stage) become a state of interlock.

The speed sensor 30 is provided to measure a rotation speed of the two-way clutch 20. Herein, a rotation speed of the two-way clutch 20 may be measured as an RPM (revolution per minute). In addition, the speed sensor 30 may be connected with the controller 10 so as to transmit information about the measured rotation speed of the two-way clutch 20 to the controller 10. Further, the controller 10 may decide, or determine, a failure of the two-way clutch 20 depending on a rotation speed of the two-way clutch 20.

Figure 2:
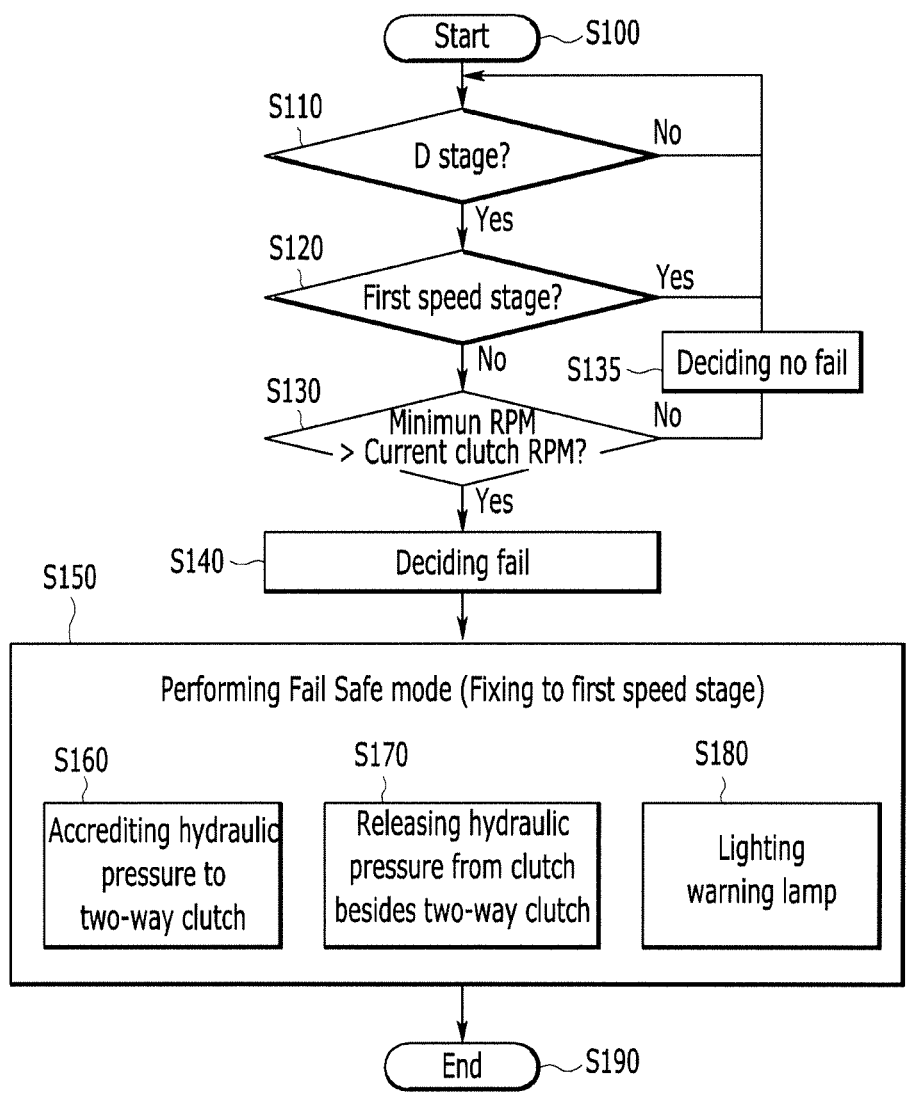
FIG. 2 is a flowchart of a control method for an automatic transmission according to an exemplary embodiment of the present disclosure.

FIG. 2 is a flowchart of a control method for an automatic transmission according to an exemplary embodiment of the present disclosure.

As shown in FIG. 2, if an engine is started at a step S100, the controller 10 may determine whether a current speed stage is a forward speed stage (D stage) at step S110.

To determine whether the two-way clutch 20 has failed is not required if it is determined that a current speed stage is not a forward speed stage (D stage), so the controller 10 repeatedly performs a determination of whether a current speed stage is a forward speed stage (D stage) at step S110.

If it is determined that a current speed stage is a forward speed stage (D stage), the controller 10 determines whether a current speed stage is a first forward speed stage at step S120.

Referring to the logic of fail-safe mode for the automatic transmission 1 to be described later, to determine whether the two-way clutch 20 has failed is not required if it is determined that a current speed stage is a first forward speed stage, so determining whether a current speed stage is a forward speed stage (D stage) at the step S110 is repeated.

If it is determined that a current speed stage is not a first forward speed stage, the controller 10 compares a minimum RPM predetermined by a person of an ordinary skill in the art, or by another method, and a current RPM of the two-way clutch 20 is measured by the speed sensor 30 at step S130.

The controller 10 decides that the two-way clutch 20 is not failed at a step S135 when a current RPM of the two-way clutch 20 is same to or higher than the minimum RPM. Then, determining whether a current speed stage is a forward speed stage (D stage) at the step S110 is returned.

The controller 10 decides that the two-way clutch 20 is failed at a step S140 when a current RPM of the two-way clutch 20 is lower than the minimum RPM. In addition, the controller 10 performs, or operates, a fail-safe mode of the automatic transmission 1 at a step S150 if fail of the two-way clutch 20 is decided at the step S140. Herein, the fail-safe mode for the automatic transmission 1 is to fix a speed stage to a first forward speed stage.

The fail-safe mode for the automatic transmission 1 may include a step S160 of supplying hydraulic pressure to the two-way clutch 20, a step S170 of releasing hydraulic pressure from clutches besides the two-way clutch 20, and a step S180 of lighting a warning lamp such that a driver recognizes a failure of the two-way clutch 20 and operation of a fail-safe mode for the automatic transmission 1.

Control of the automatic transmission may be ended at a step S190 if a fail-safe mode for the automatic transmission 1 is performed, or operated or entered.

According to an exemplary embodiment of the present disclosure, the fail-safe mode of the two-way clutch 20 can be effectively performed, or operated or entered, based on a simple failure deciding process. Therefore, safety of a vehicle can be ensured even while the two-way clutch 20 has failed.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A control method for an automatic transmission and a two-way clutch, the control method comprising:
   determining whether a current speed stage is a forward speed stage;
   comparing a rotation speed of the two-way clutch with a predetermined minimum rotation speed if a current speed stage is a forward speed stage;
   deciding that the two-way clutch has failed when a rotation speed of the two-way clutch is lower than the predetermined minimum rotation speed, and
   performing a fail-safe mode if the two-way clutch has failed.

2. The control method of claim 1, wherein the step of determining whether a current speed stage is a first forward speed stage precedes the step of comparing a rotation speed of the two-way clutch with a predetermined minimum rotation speed if it is determined that a current speed stage is a forward speed stage.

3. The control method of claim 2, wherein the step of determining whether a current speed stage is a forward speed stage is performed again if it is determined that a current speed stage is a first forward speed stage.

4. The control method of claim 2, wherein the step of comparing the rotation speed of the two-way clutch with the predetermined minimum rotation speed is performed if it is determined that a current speed stage is not a first forward speed stage.

5. The control method of claim 1, wherein the step of determining whether a current speed stage is a forward speed stage is repeatedly performed if it is determined that a current speed stage is not a forward speed stage.

6. The control method of claim 1, further comprising deciding that the two-way clutch has not failed when a rotation speed of the two-way clutch is the same as or higher than a predetermined minimum rotation speed,
    wherein the step of determining whether a current speed stage is a forward speed stage is repeated if it is decided that the two-way clutch has not failed.

7. The control method of claim 1, wherein a rotation speed of the two-way clutch is measured by a speed sensor.

8. The control method of claim 1, wherein the fail-safe mode comprises,
    fixing a speed stage to a first forward speed stage,
    supplying hydraulic pressure to the two-way clutch; and
    releasing hydraulic pressure from a clutch other than the two-way clutch.

9. The control method of claim 8, wherein the fail-safe mode further comprises lighting a warning lamp such that a driver recognizes a failure of the two-way clutch and an operation of the fail-safe mode for the automatic transmission.

10. The control method of claim 1, the control method is started together with starting of an engine.

11. The control method of claim 1, the control method ending when operation of the fail-safe mode is completed.

\* \* \* \* \*